United States Patent [19]

Kim

[11] Patent Number: 5,245,650
[45] Date of Patent: Sep. 14, 1993

[54] METHOD FOR ADDING TENANT FUNCTION TO A VOICE MAIL SYSTEM

[75] Inventor: Jae-Hong Kim, Suwon, Rep. of Korea

[73] Assignee: SamSung Electronics Co., Ltd., Suwon, Rep. of Korea

[21] Appl. No.: 636,240

[22] Filed: Dec. 31, 1990

[30] Foreign Application Priority Data

Jun. 21, 1990 [KR] Rep. of Korea ................. 1990-9169

[51] Int. Cl.$^5$ .................. H04M 1/64; H04M 3/50
[52] U.S. Cl. ........................... 379/89; 379/84; 379/211; 379/233
[58] Field of Search .............. 379/89, 67, 88, 84, 379/233, 211

[56] References Cited

U.S. PATENT DOCUMENTS

| | | | |
|---|---|---|---|
| 4,307,454 | 12/1981 | Haben et al. | 379/89 X |
| 4,602,129 | 7/1986 | Matthews et al. | 379/88 |
| 4,972,461 | 11/1990 | Brown et al. | 379/67 |

*Primary Examiner*—Thomas W. Brown
*Attorney, Agent, or Firm*—Robert E. Bushnell

[57] ABSTRACT

A method is disclosed for adding a tenant function to a voice mail system. The steps of the method include: receiving a telephone call from a subscriber; determining a tenant group number of a line corresponding to the telephone call; storing the tenant group number the corresponding line; inputting a voice mail number; determining whether the voice mail number is represented in the same tenant group; and providing a voice mail service when the voice mail number represents the same tenant group, or otherwise transmitting a message that a wrong voice mail number has been input.

3 Claims, 3 Drawing Sheets

METHOD FOR ADDING TENANT FUNCTION TO A VOICE MAIL SYSTEM

BACKGROUND OF THE INVENTION

The present invention concerns a method for grouping the receivers of a voice mail system (VMS) so as to achieve the effect of several VMSs by using a single VMS.

Although the conventional VMS is made to have a given number of extensions of the receiver's connecting line, each of the receivers requires a separate VMS for the case of different voice guidance. In addition, the VMS is made to serve only a single receiver, and therefore, it is impossible to combine a plurality of subscribers with different voice guidance regardless of the port to connect with.

Hence, if a plurality of subscribers in one building or group use the VMS for an equivalent purpose, each of the subscribers must purchase a separate VMS of high price, which is undesirable from an economic point of view. The aforementioned equivalent the purpose refers to uses such as voice guidance, time scheduling, etc.

SUMMARY OF THE INVENTION

One object of the present invention is to provide a method for using a single VMS to serve a plurality of subscribers with an equivalent purpose, wherein the subscribers are grouped into several groups each identified by a tenant group number.

According to the present invention, a method for adding a tenant function to a voice mail system comprises the steps of: receiving a telephone call from a subscriber; determining a tenant group number of a corresponding line to the telephone call; storing the tenant group number; receiving a desired voice mail number from the caller; determining whether the voice mail number is represented in the tenant group of the corresponding line; and providing a voice mail service when the voice number represents the tenant group of the corresponding line, otherwise transmitting an error message that a wrong voice mail number was received.

The present invention will now be described more specifically by way of example with reference to the attached drawings.

BRIEF DESCRIPTION OF THE ATTACHED DRAWINGS

DETAILED DESCRIPTION OF A PREFERRED EMBODIMENT

Figure 1:
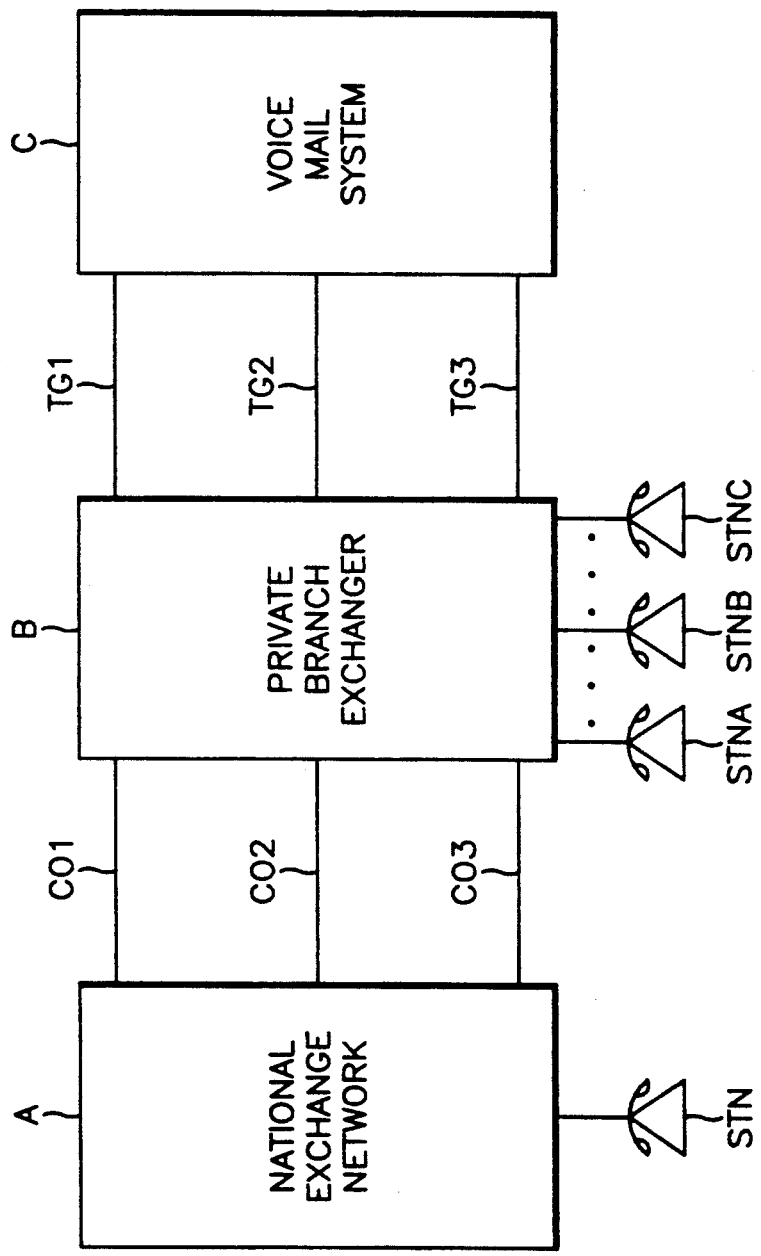
FIG. 1 is a block diagram for illustrating a voice mail system with receiving lines divided into a plurality of tenant groups according to the present invention.

In reference to FIG. 1, national exchange network (A) is connected with a private branch exchanger (B) via trunk lines (CO1-CO3). The receiving lines connecting the private branch exchanger with a voice mail system (C) are divided into lines of individual tenant groups (TG1-TGn). Further, the private branch exchanger "B" has a plurality of telephones "STNA", "STNB", "STNC", etc. of different companies "comp1", "comp2", "comp3", etc. connected thereto. For example, if a subscriber "STN" connected to the national exchange network (A) dials 123-5678 in order to receive the voice mail service of the telephone "STNB" of the company "comp2", the private branch exchanger (B) connects the generated signal to a line of tenant group (TG2), which calls the voice mail system (C) to only provide the voice mail service of the company "comp2".

Figure 2:
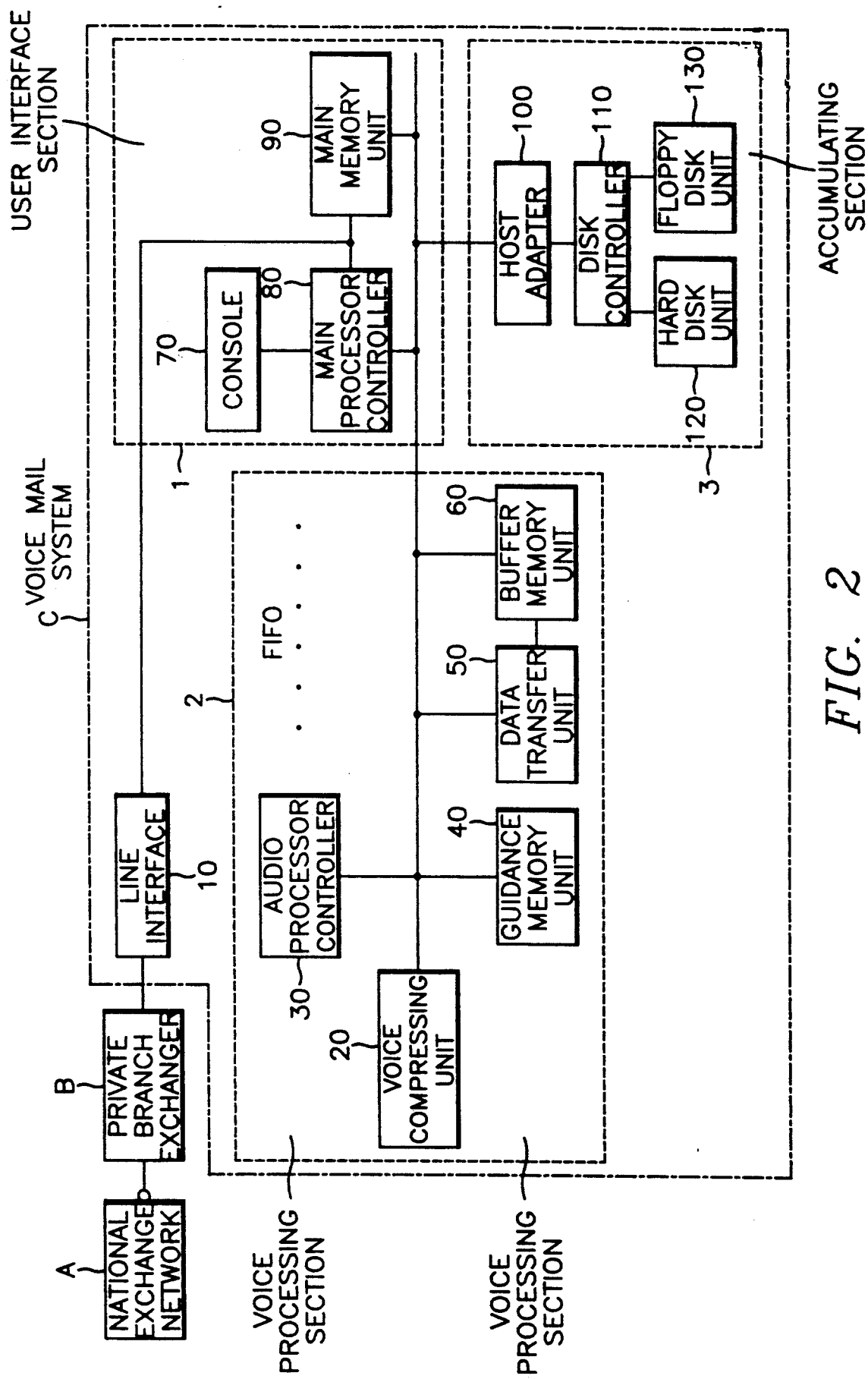
FIG. 2 is a specific block diagram for illustrating the voice mail system of FIG. 1.

In reference to FIG. 2, the national exchange network (A) is connected to the voice mail system C through the private branch exchanger B and through a line interface unit LIU (10) for subscriber's connection. A voice compressing unit VCU (20) in voice processing section 2 is connected to a line that connects an audio processor controller APC (30) and a guidance memory unit GMU (40). The APC (30) controls a guidance message. The GMU (40) temporarily stores the guidance message for transferring. The VCU (20) is also connected to a data transfer unit DTU (50) which in turn is connected to a buffer memory unit BMU (60). The DTU (50) transmits and receives the guidance message and buffering message. The BMU (60) buffers the input/output message of the DTU (50). A console is connected to a main processor controller (80), and allows user control of the voice mail system through main processor controller MPC (80). A main memory unit MMU (90) stores a program to control the whole system in conjunction with MPC (80). An SCSI/SASI host adapter SHA 100 in accumulating section 3 transmits and receives data between a disk controller DKC (110) and the BMU (60), wherein the SCSI designates a small computer system interface and the SASI designates schugart associated system interface. The DKC (110) is also connected to a hard disk unit HDU (120) and a floppy disk unit FDU (130).

Figure 3:
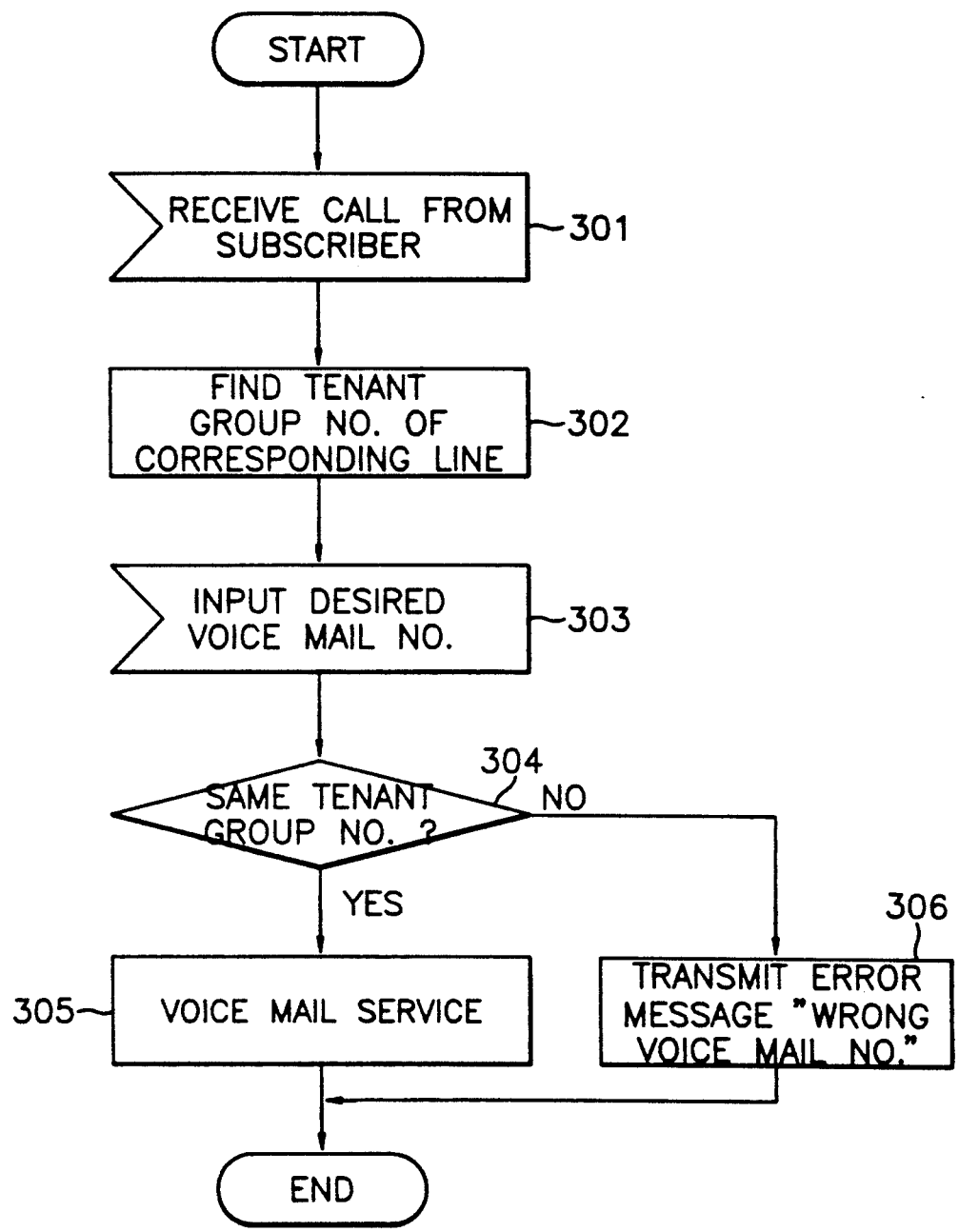
FIG. 3 is a flow chart for illustrating the present invention.

In reference to FIG. 3, the method of the present invention comprises the steps of: receiving a telephone call from a subscriber in step 301; determining the tenant group number in step 302 of the corresponding line; storing the tenant group number; receiving a desired voice mail number in step 303 from the caller; determining in step 304 whether the voice mail number is represented in the tenant group of the corresponding line; and providing a voice mail service in step 305 to the caller when the voice mail number represents the tenant group of the corresponding line, otherwise transmitting an error message in step 306 that a wrong voice mail number was received.

Hereinafter, the operation of the voice mail system according to the present invention will now be described with reference to FIGS. 1-3.

The MMU (90) stores data tenant groups TG1-TGn which respectively represent companies "comp1", "comp2", "comp3". In step 301 MPC (80) continuously checks an output port of LIU (10) at a constant rate to receive a subscriber's call. If a subscriber calls, in step 302 the MPC (80) compares the call with tenant groups stored in MMU (90), thus determining whether the calling represents a tenant group of a corresponding line, and storing a result in MMU (90). After storing the result in the MMU (90), a desired voice mail number is input in step 303. In step 304, the MPC (80) determines whether the voice mail number is represented in the same tenant group as obtained in step 302. If the voice mail number is represented in the same tenant group, the MPC (80) in step 305 controls the accumulating section (3) to read out corresponding voice mail data in HDU (120). The voice mail data is transferred through DKC (110) and SHA (100) to voice processing section (2) for producing an output to the LIU (10). However, if the voice mail number is not represented in the same tenant group, in step 306 a message is read out from the HDU (120) of the accumulating section (3) that the voice mail number was wrongly inputted. The message is then transferred through the voice processing section (2) to the LIU (10).

As stated above, the present invention adds the tenant function to the voice mail system, so that a single VMS may provide the same voice mail services for a plurality of subscribers.

What is claimed is:

1. A method for a voice mail system, comprising the steps of:
   receiving a telephone call from a subscriber;
   determining, in response to the telephone call, a line of a corresponding tenant group of the telephone call;
   storing a tenant group number representing the corresponding tenant group of the line;
   receiving a voice mail number from the subscriber;
   determining whether the voice mail number is represented in the corresponding tenant group of the line; and
   providing a voice mail service to the subscriber when the voice mail number is represented in the corresponding tenant group of the line, and transmitting an error message when the voice mail number is not represented in the corresponding tenant group of the line.

2. A method for a single voice mail system to achieve an effect of a plurality of voice mail systems, said method comprising the steps of:
   determining in a main processor controller whether a telephone call from a subscriber is received;
   determining in the main processor controller a tenant group number for a tenant group of a line corresponding to the received telephone call, and storing said tenant group number in a main memory unit;
   receiving a voice mail number from the subscriber;
   determining in the main processor controller whether the voice mail number from the subscriber is represented in said tenant group of the line;
   if the voice mail number from the subscriber is represented in said tenant group of the line, providing a voice mail service by retrieving voice mail data from a hard disk unit and transferring said voice mail data through a disk controller and host adapter to a voice processing section to produce an output to a line interface unit; and
   if the voice mail number from the subscriber is not represented in said tenant group of the line, generating an error message.

3. A method for a single voice mail system to achieve an effect of a plurality of voice mail systems, said single voice mail system comprising:
   a user interface section comprising a console to provide user control and maintenance of the single voice mail system, a main processor controller to control the single voice mail system in accordance with user interface of the console, and a main memory unit to store a program to control the single voice mail system in conjunction with the main processor controller;
   a line interface unit connecting a telephone call from a subscriber via a national exchange network through a private branch exchanger to the main processor controller and the main memory unit;
   a voice processing section comprising a voice processing unit connected to:
     an audio processor controller to control a guidance message;
     a guidance memory unit to store the guidance message;
     a data transfer unit to receive and transmit the guidance message and a buffering message of a buffer memory unit; and
     the buffer memory unit to buffer the guidance message of the data transfer unit; and
   an accumulating section comprising a host adapter to transmit and receive the guidance message and the buffering message between the buffer memory unit and a disk controller, and the disk controller connected to and controlling a hard disk unit and a floppy disk unit, said method comprising the steps of:
   determining in the main processor controller whether the telephone call from the subscriber is received;
   determining in the main processor controller a tenant group of a line, in response to the telephone call, and storing a tenant group number representing said tenant group in the main memory unit;
   receiving a voice mail number from the subscriber;
   determining in the main processor controller whether the voice mail number from the subscriber is represented in said tenant group;
   if the voice mail number from the subscriber is represented in said tenant group, providing a voice mail service by retrieving voice mail data from the hard disk unit and transferring said voice mail data through the disk controller and host adapter to the voice processing section to produce an output to the line interface unit; and
   if the voice mail number from the subscriber is not represented in said tenant group, generating an error message.

* * * * *

UNITED STATES PATENT AND TRADEMARK OFFICE
CERTIFICATE OF CORRECTION

PATENT NO. : 5,245,650
DATED : 14 September 1993
INVENTOR(S) : Jae-Hong Kim It is certified that error appears in the above-identified patent and that said Letters Patent is hereby corrected as shown below:

On title page,

IN THE ABSTRACT

Line 4, change "line corresponding" to --corresponding line--;

Column 1,

Line 40, after "voice", insert --mail--;

Column 2, line 23, after "A console", insert --CNS(70) in user interface sectional--.

Signed and Sealed this

Eighteenth Day of October, 1994

Attest:

BRUCE LEHMAN

*Attesting Officer*        *Commissioner of Patents and Trademarks*